Sept. 30, 1930.  E. P. DU PONT  1,776,894
CONVERTIBLE AUTOMOBILE BODY
Filed April 11, 1927
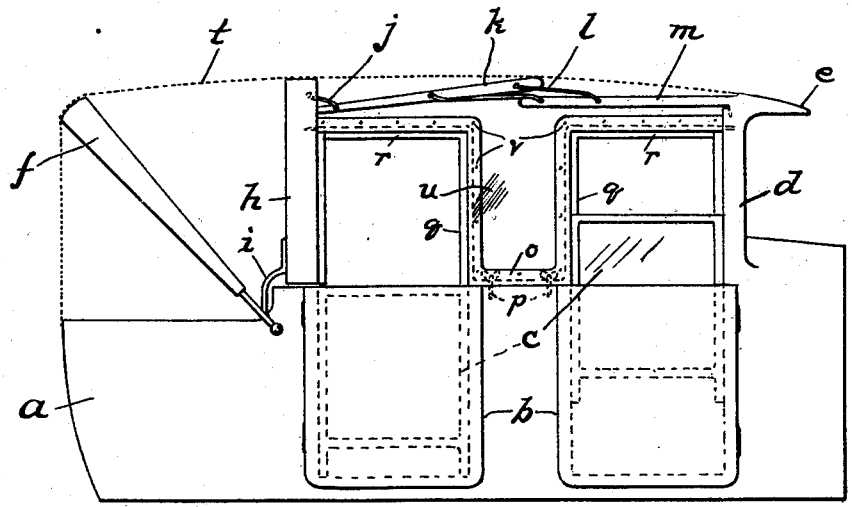
FIG. 1.
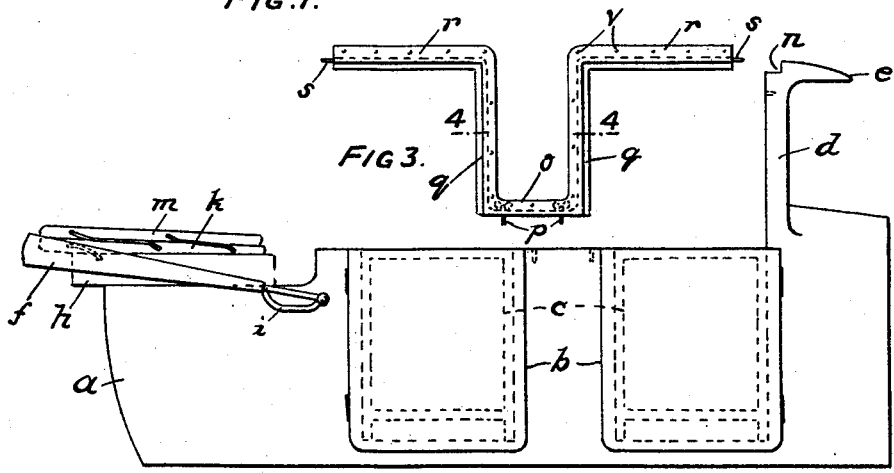
FIG. 2.
FIG. 3.
FIG. 4.
WITNESS:
Rob't P. Kitchel
INVENTOR
Eleuthere Paul duPont
BY
Brown + Harding
ATTORNEYS.

Patented Sept. 30, 1930

1,776,894

UNITED STATES PATENT OFFICE

ELEUTHERE PAUL DU PONT, OF MONTCHANIN, DELAWARE

CONVERTIBLE AUTOMOBILE BODY

Application filed April 11, 1927. Serial No. 182,582.

My invention relates to an improvement in automobile bodies and more particularly to the provision of a body so constructed as to permit of the conversion from an open to a closed type and vice versa, with a minimum of difficulty and time.

Heretofore numerous forms of convertible automobile bodies have been devised, but have not proved entirely satisfactory primarily because of the complication of their construction and the practical difficulty of accomplishing the conversion from open to closed type and vice versa.

Now it is the object of my invention to provide a body so constructed that it may be converted from an open body to a closed body with relatively the simplicity and ease of raising the top on the ordinary open body.

Further objects of my invention are to provide a simple and economical structure which will be relatively inexpensive to construct and which will be highly efficient for the purpose intended.

Having now indicated, in a general way, the nature and purpose of my invention, I will proceed to a detailed description thereof with reference to the accompanying drawings in which there is illustrated a preferred embodiment and in which :—

Fig. 1 is a side view of a body for an automobile embodying my invention, the body being shown as closed.

Fig. 2 is a side view of the body shown in Fig. 1, the body being open.

Fig. 3 is a side view of a window frame member.

Fig. 4 is a sectional view on line 4—4, Fig. 3.

$a$ indicates a body provided on both sides with front and rear doors $b$, $b$, which are provided with grooves within which are adapted to slide windows $c$. The doors are of a height permitting the windows to be wholly concealed therein and suitable means of any well known character provided for raising and lowering the windows.

The body is provided at the forward edge of the front doors with wind shield supports $d$, within which is supported a wind shield of any well known type and from the top of which a sun shield $e$ extends forwardly. The vertical portions of the wind shield support on opposite sides of the body are grooved in line with the grooves in the doors and provides frame members for the windows $c$.

The body is provided with a collapsible top comprising a rear bow $f$ pivoted to the body and a bow $h$ pivotally connected to bow $f$ through brackets $i$. Portions of the bow $h$, when the top is raised, stand vertically adjacent the rear edges of the rear doors $b$ and the forward edges of such vertical portions are grooved in line with the grooves in the doors $b$ and afford frame members for the windows in doors $b$. Connected to the bow $h$ through pivoted links $j$ is a forwardly extending bow $k$ to which in turn is connected, through pivoted links $l$, a front bow $m$, the transverse portion of which is adapted, when the top is raised, to rest in a recess $n$ in the wind shield support and to be secured thereto to maintain the top in raised position.

Frame members, each having a horizontal portion $o$, adapted to rest on and be detachably secured to opposite sides of the body between the doors $b$, as by means of wing screws $p$, are provided with vertical extensions $q$, provided with grooves which extend in line with the grooves in the front and rear of the rear and front doors $b$ and form side frames for the windows $c$ in the doors respectively, and with horizontal extensions $r$, the ends of which are secured to the vertical portions of the bow $h$ and wind shield support $d$ respectively by means of dowels $s$, and which are grooved and form the top frames for the windows $c$.

The top is provided with a cover $t$, of any suitable material, secured to the body at the rear end to the bow $m$ in front. The top cover is provided on each side with an extension $u$, which extends down between vertical portions $q$ of the frame member and is adapted to be detachably fastened, by means of any suitable form of detachable fastener $v$, to the frame member throughout its extension.

In the operation of my invention, assuming that the body is closed as shown in Fig. 1 and it is desired to open it, the top covering is detached from the parts $o$, $q$ and $r$ of the frame members, the windows c lowered into the doors and the forward end of the top released from the wind shield support. The top may then be lowered as an ordinary collapsible top. The frame member is then removed, after removing the wing screws p, and stored in any convenient place. The frame member may be made up of jointed sections or sections hinged together for convenience in storing, if desired.

When it is desired to close the body, the frame member is secured in place by the wing screws p, the top raised as an ordinary top and the top covering secured to the frame member. The windows c may then be raised and the body will be efficiently enclosed.

Having now fully described my invention, what I claim and desire to protect by Letters Patent is:—

The combination with an automobile body provided with a pair of spaced doors in each side and windows slidable within the doors, said body being provided with upright posts forwardly of the front doors, of frame members each comprising a horizontal portion adapted to be secured to a side between the doors, and a plurality of upright members arranged to form frame members for the windows, an upright collapsible top frame including a member at the rear of the rear door and a plurality of link-connected members carried thereby and adapted, under downward pressure, to expand lengthwise of the automobile body and form a roof frame engaging said upright posts, and a cover for the top frame having portions adapted to extend between the upright members and to be secured thereto to apply downward pressure against the link-connected members and thereby hold the roof frame against the upright posts.

In testimony of which invention, I have hereunto set my hand, at Montchanin, Delaware, on this fourth day of April, 1927.

ELEUTHERE PAUL DU PONT.